July 20, 1926.

I. R. HIPPENMEYER

VALVE

Filed April 30, 1923

1,593,260

2 Sheets-Sheet 1

Inventor
Irving R. Hippenmeyer
by Hewitt S. Dixon
Atty

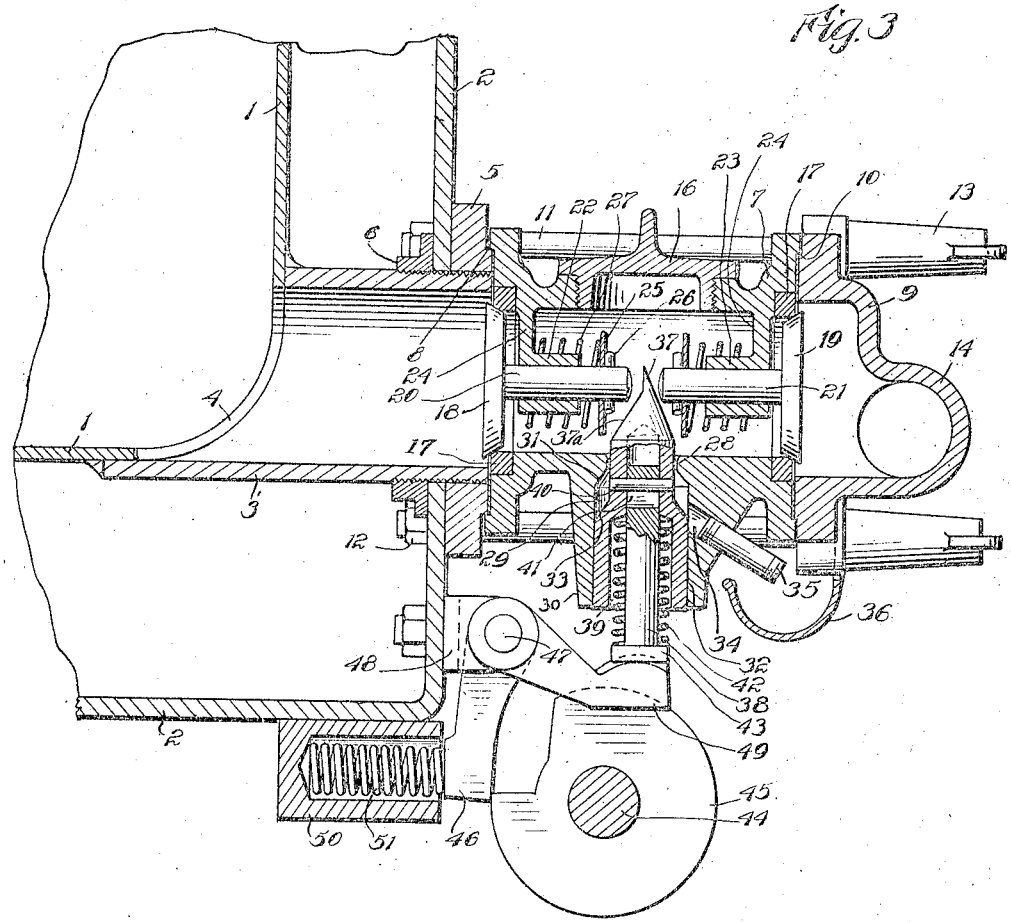

Patented July 20, 1926.

1,593,260

UNITED STATES PATENT OFFICE.

IRVING R. HIPPENMEYER, OF WAUKEGAN, ILLINOIS, ASSIGNOR TO THE CREAMERY PACKAGE MFG. COMPANY, OF CHICAGO, ILLINOIS, A CORPORATION OF ILLINOIS.

VALVE.

Application filed April 30, 1925. Serial No. 26,920.

The invention relates to valves for the control of the flow of edible fluids, and known as sanitary valves. This application is a continuation in part of my application Serial No. 720,155, filed June 16th, 1924.

In the handling of edible fluids such as milk, which is subject to bacterial contamination, all of the holders, piping and fittings, through which the milk is passed in its treatment in preparation for consumption as food, must be kept in a sanitary condition. This requires that such apparatus may be readily dis-assembled for thorough cleansing after their operative use. One of the steps in the preparation of milk for food consumption is the Pasteurization of the milk to destroy the pathogenic bacteria, the generally accepted method being to hold quantities of milk at a pre-determined temperature for a pre-determined time in insulated or heated containers of large capacity. These containers are ordinarily filled and emptied through sanitary piping, the milk being treated in successive batches and the filling and emptying being controlled by sanitary valves positioned in the inlet and discharge pipes. It will be obvious that any leakage or failure in these valves will permit the uncontrolled flow through the container of a quantity of milk which has not been held for the required time at the necessary temperature. If such leakage is permitted to pass into the discharge piping with the properly Pasteurized milk, there is obvious danger of reinoculation of the Pasteurized milk by the undestroyed bacteria in the milk which has escaped the prescribed treatment.

It is the principal object of this invention to provide a sanitary valve which is constructed to direct outwardly from the milk passages any leakage occurring in the valve when it is in closed position, thus preventing the inter-mixture of such leakage with the body of milk properly treated. A further object is to provide a valve of such construction that it may be readily removed from its connections, without materially disturbing the latter, for disassembling and cleansing.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Figure 1:
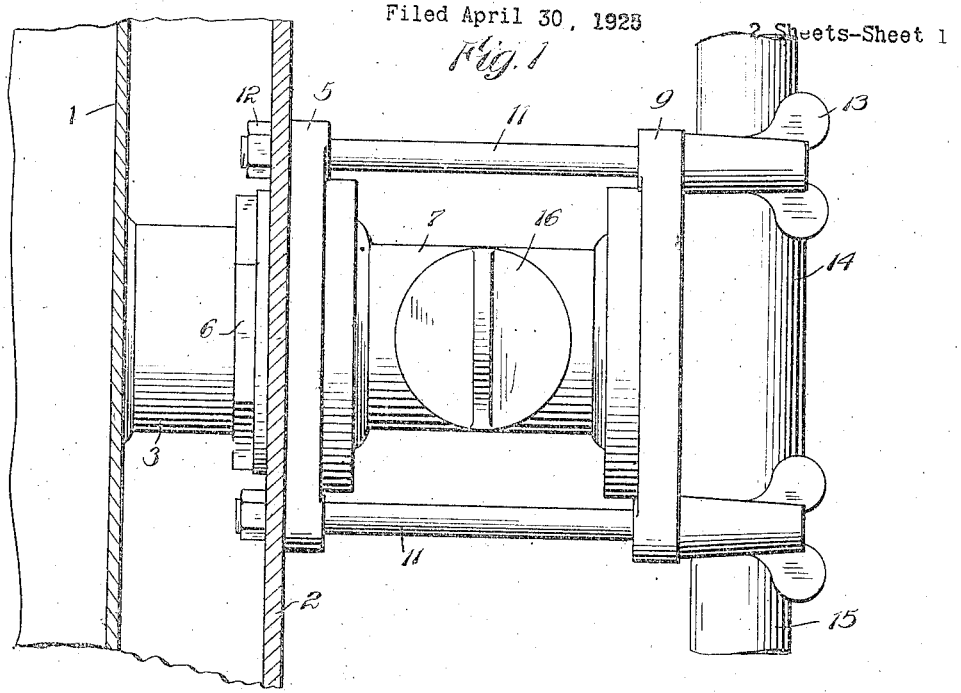
Figure 2:
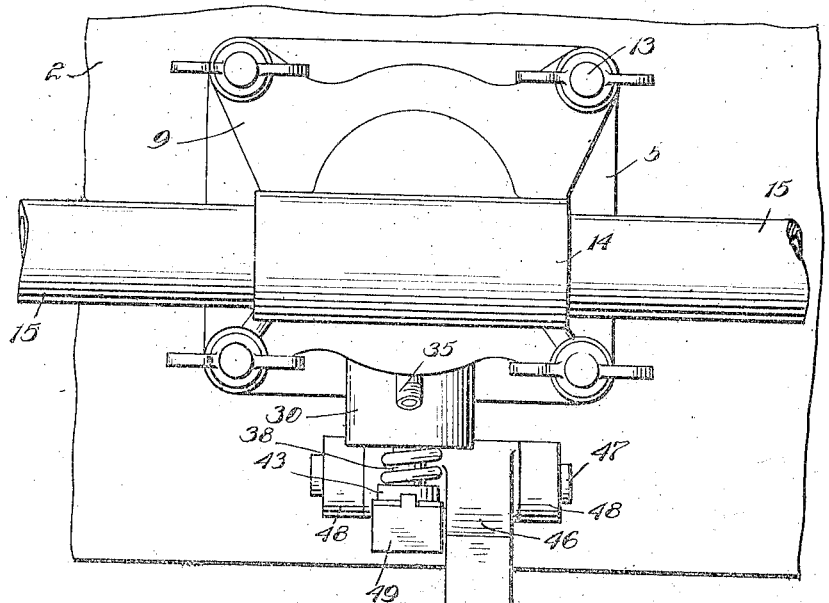

Referring to the drawings, Fig. 1 is a plan view of the valve and its associated connections. Fig. 2 is an outer end view of the same. Fig 3 is a sectional elevation of the valve and associated parts taken on a vertical plane through the center of the device. While illustrated herein as controlling a holder outlet, the valve is equally adaptable to the inlet thereto.

In the drawings the numeral 1 indicates a fractional portion of the inner wall of a jacketed Pasteurizing holder, of which the outer jacket wall is indicated at 2, the space between being designed to contain steam or hot water for the heating of the contents within the inner walls of the holder. A tube 3 extending through the jacket wall 2 is preferably sealed to the inner wall 1 and communicates with the interior of the latter through an opening 4 forming a discharge outlet for the contents of the holder. The outer end of the tube 3 is preferably screw threaded and carries an outer collar plate 5, against which the jacket wall 2 is secured in sealing abutment by the inner nut 6, threaded on the tube 3. Outwardly of the plate 5 is a longitudinally chambered valve casing 7 endwardly abutting the plate 5 and preferably having a slightly recessed end surface engageable over a concentric shoulder 8 formed on the plate 5 to position the casing chamber in alined relation to the tube 3. The outer end of the casing 7 is supported by a cover plate 9 having a similar positioning shoulder 10 fitting within the slightly recessed outer end of the casing. Securing bolts 11 extending through the marginal portions of the plates 5 and 9 and the jacket wall 2, carry heads or nuts 12 on the inner side of the jacket wall. The outer ends of the securing bolts are preferably screw threaded and severally provided with wing nuts 13, which may be adjustably tightened against the cover plate 9 to clamp the several parts of the structure described in rigid relation. The bolts 11 are spaced from each other sufficiently to allow the lateral withdrawal of the casing 7 from between its supporting plates when the wing nuts 13 are loosened.

The cover plate 9 is centrally apertured and has formed preferably integrally therewith an outlet sleeve 14 adapted to receive the discharge pipes 15, for carrying away the treated milk discharged from the holder through the valve casing 7, the sleeve 14 communicating internally with the outer end of the chamber in the valve casing. The upper portion of the valve casing 7 is preferably provided with a cleaning opening, having a screw threaded cap 16 removably seated therein, the opening being provided for access to the interior of the casing and the operating parts hereinafter described.

Each of the open ends of the casing 7, communicating respectively with the tube 3 and sleeve 14, is valve controlled, and is preferably provided with an inset annular ring 17 of suitable noncorrosive material secured to the casing and forming valve seats. Co-operatively associated with the rings 17 are outwardly opening poppet valves 18 and 19 having inwardly extending axial stems 20 and 21 operatively supported in sleeves 22 and 23, preferably formed integrally with the casing wall through the supporting integral connections 24. The inner ends of the valve stems 20 and 21 extend inwardly of their respective supporting sleeves and each carries a washer 25 abutting a securing pin 26 positioned transversely in the respective valve stems. The valves are normally held in closed position by the springs 27, confined between the washers 25 and the respective connecting portions 24.

In the lower portion of the casing wall is an opening 28 communicating with a passage 29 enclosed by an integral lateral extension 30 of the casing wall. The passage 29 is preferably of cylindrical form and of greater diameter than the opening 28, the upper end of the passage being constricted by the tapering shoulder 31 leading to the opening 28. Positioned within the passage 29 is a plunger 32 of which the lower portion is operatively fitted within the passage. The upper portion of the plunger 32 is of substantially less diameter than the opening 28 and adapted to extend therethrough into the interior of the casing 7. The plunger 32 is provided between its upper and lower portions with a tapered shoulder 33, forming a valve co-operating with the tapered seat 31 to close the opening 28 when the plunger is in its uppermost position.

The passage 29 is provided with an outlet port 34 opening into the passage between the lowermost position of the valve shoulder 33 and the seat 31, so that with the valve plunger in lowered position the outlet port 34 is in communication with the interior of the casing through the opening 28. The port 34 may be provided with a pipe nipple 35 extending over a trough 36 carried by the casing supporting structure and adapted to receive any liquid flowing therethrough and carry it to a suitable receptacle (not shown).

The upper end of the valve plunger 32, extending into the interior of the casing 7, is tapered in shape, the apex of the plunger extending between the spaced ends of the valve stems 20 and 21 in such relation that by the lifting of the valve plunger 32 its tapered end portion engages the ends of the valve stems and operates the latter outwardly through their sleeve supports, and thereby opens both of the poppet valves 18 and 19. A desirable advantage is secured by arranging the stem contacting faces of the tapered end of the plunger at different angles to the axis of the plunger, as indicated at 37 and 37ª, so that the outlet valve stem 21 continues to be operatively engaged by the face 37, during the withdrawl movement of the plunger, after the inlet valve stem 20 has been released from engagement with the opposite face 37ª. By this arrangement the closure of the outlet valve 19 is retarded during the closing operation for a short period between the seating of the inlet valve 18 and the uncovering of the port 34, to permit the liquid otherwise trapped in the chamber between the two valves to pass through the outlet before the latter is finally closed, thus preventing the wastage of a trapped quantity of liquid which would otherwise escape through the port 34 as the plunger reached its lower position.

In the upward movement of the plunger 32 its lower portion passes over the outlet port 34, and with the seating of the valve shoulder 33 in uppermost position the opening 28 is closed against passage of milk therethrough when the valves 18 and 19 are in open position. With the lowering of the plunger 32 and reseating of the valves 18 and 19, the outlet port 34 is in open communication through the opening 28 with the interior of the casing, and will conduct away any milk remaining in the casing. The passage 29 and outlet 34 will likewise conduct away any milk which leaks past the poppet valves, should either of them be not tightly seated for any reason. It will thus be observed that no milk can pass the valves into the discharge lines for the Pasteurized product, except when the poppet valves are open in their normal operation.

The plunger 32 is operated by means of a push rod 38 positioned in an axial bore 39 extending into the plunger from its lower end. The upper end of the rod 38 is slidably fitted in the constricted upper end of the bore 39, and is operatively secured to the plunger by means of a cross pin 40 secured in the plunger and extending through a longitudinal slot 41 in the end portion of the rod 38, the slot permitting an appreciable longitudinal play between the push rod and the plunger. The lower portion of the bore 39 is of greater diameter than the push rod providing an annular space within which is positioned a spring 42 confined between the shoulder formed between the upper and lower portions of the bore and a flanged head 43 formed on the lower end of the push rod. By this means the plunger 32 is moved upward into resiliently maintained contact with its valve seat 31, assuring a closure of the opening 28 at the upward limit of movement of the push rod 38.

The push rod 38 may be operated by manual means, but is preferably operated by automatic time controlled mechanism, which may be arranged in connection with a series of holding tanks for alternately filling, holding and discharging the several holders during time periods arranged to accomplish the proper Pasteurization of the milk. A portion of such mechanism is illustrated herein, comprising the time operated shaft 44 carrying a cam 45 in operative contact with one arm 46 of a bell crank pivotally supported on a pin 47 having its bearings in the brackets 48 mounted on the jacket wall 2. The other offset arm 49 of the bell crank extends beneath the push rod 38 in operative contact with the head 43.

Supported on the jacket wall 2 is a tubular holder 50 within which is confined a compression spring 51 outwardly bearing upon the cam contacting arm 46 of the bell crank and tending to maintain the latter in contact with the cam. The cam 45 is formed to permit the spring 51 to periodically swing the bell crank into position to raise the plunger 32 and open the poppet valves 18 and 19, thereafter reversing the movement of the bell crank and lowering the plunger into position permitting the closure of the poppet valves, the operation of the shaft 44 and cam 45 being timed to accomplish the holding of the milk in the holder for the required time for Pasteurization.

I claim as my invention:—

1. A device of the class described, comprising a casing having a chamber with inlet and outlet openings, a valve operatively controlling each of said openings, said casing having a passage communicating with said chamber and leading outwardly of said casing independently of said inlet and outlet openings, and means for operating said valves, said means effecting the opening and closing of said passage when said valves are closed or opened respectively.

2. In a device of the class described, a casing having a tubular chamber therethrough, a valve positioned at each end of said tubular chamber adapted to effect the opening and closing thereof respectively, operating supports for said valves within said chamber, said casing having a lateral passage communicating with said chamber, and means operable through said passage to effect the opening of said valves and concurrently close said passage and to effect the closing of said valves and concurrently open said passage.

3. In a device of the class described, a casing having a tubular chamber, a pair of oppositely positioned valves operable respectively to open and close the ends of said chamber, a pair of stems operatively supporting said valves and having bearings within said casing, resilient means normally maintaining said stems and valves in inward position to close the ends of said chamber, the inner ends of said stems being spaced from each other, said casing having a lateral opening and an outward passage communicating with said opening, a plunger slidably supported in said passage operable to open and close said opening, said plunger having a tapered end portion extending freely through said opening and adapted to engage the adjacent ends of said valve stems, and means for longitudinally moving said plunger whereby said valves are opened and closed coincidently with the closing and opening of said lateral opening.

4. In a device of the class described, a valve casing having a tubular chamber, valves controlling the ends of said chamber having stems operatively supported within said chamber, the lateral portion of said casing having a passage with an opening into said chamber and an outlet port from said passage, said passage being constricted adjacent said opening to form a valve seat, a plunger operatively positioned in said passage adapted to co-operate with said seat to open and close said opening and having an end portion extending freely through said opening adapted to operatively engage said valve stems, said plunger having an outwardly opening axial bore, a push rod slidably mounted in said bore, means for limiting the relative movement between said plunger and said push rod, and resilient means confined between said plunger and said push rod.

5. A device of the class described, comprising a casing having a chamber with inlet and outlet openings, a pair of valves controlling said inlet and outlet openings respectively and having supporting stems operatively supported in said chamber, a plunger slidably supported in the side wall of said casing and extending into said chamber, said plunger having a tapered end adapted to engage and operate said valve stems, a pivoted lever having operative connection with said plunger, a cam and resilient means maintaining said lever in operative contact with said cam.

6. A device of the class described, comprising a holder having an outlet tube, an inner plate rigidly mounted on said tube, a valve casing abutting said plate and having a chamber opening into said tube, an outer plate oppositely abutting said casing, said outer plate having a passage communicating with said casing chamber and being adapted for connection with a discharge pipe, valves controlling said chamber supported within said casing, and means for securing said plates in supporting abutment with said casing, said means being adjustable to permit the lateral withdrawal of said casing from between said plates without material displacement of said plates.

7. A device of the class described, comprising a casing having a chamber with inlet and outlet openings, a valve operatively controlling each of said openings, said casing having a passage communicating with said chamber and leading outwardly of said casing independently of said inlet and outlet openings, a valve controlling said passage, and means for operating said valves, said means being operable to open said passage valve coincidently with the closing of said inlet and outlet valves, and to close said passage valve coincidently with the opening of said inlet and outlet valves.

8. A device of the class described, comprising a casing having a chamber with inlet and outlet openings and with a passage from said chamber opening outwardly of said casing independently of said inlet and outlet openings, a controlling valve for each of said inlet and outlet openings, a pair of stems operatively supporting said valves and positioned with their ends adjacent, means normally maintaining said valves in closed position, and a plunger operatively positioned in said passage adapted to open and close said passage and having a portion extending into said chamber adapted to operatively engage said valve stems, said plunger being operable to open said valves and close said passage, and reversely operable to close said valves and open said passage, said extended portion of said plunger being shaped to retain operative engagement with said outlet valve stem for a period after disengagement from said inlet valve stem during the operation of said plunger to close said valves.

9. A device of the class described, comprising a casing having a chamber with inlet and outlet openings and with a passage from said chamber opening outwardly of said casing independently of said inlet and outlet openings, a controlling valve for each of said openings and said passage, and actuating means for said valves operable concurrently to open said inlet and outlet valves and close said passage valve, and to close said inlet and outlet valves and open said passage valve, the operation of closing said outlet valve and opening said passage valve being retarded until after said inlet valve has been closed.

10. A device of the class described, characterized by having a chamber with valve-controlled inlet and outlet openings forming a normal passage for the flow of liquid therethrough, an auxiliary passage opening outwardly from said chamber to divert from the normal passage any leakage thereinto occurring when said normal passage is closed, and controlling means for said auxiliary passage operable to close said auxiliary passage when said normal passage is opened and to open said auxiliary passage when said normal passage is closed.

11. A device of the class described, characterized by having a normal passage for the flow of liquid therethrough, a pair of valves operable to control said normal passage and arranged in spaced relation to each other, an auxiliary passage opening between said spaced valves outwardly from said normal passsage to divert therefrom any leakage thereinto occurring when said valves are in closed position, and controlling means for said auxiliary passage operable to close said auxiliary passage when said valves are opened and to open said auxiliary passage when said valves are closed.

In witness whereof I have hereunto affixed my signature.

IRVING R. HIPPENMEYER.